US012572528B1

(12) United States Patent
Woollen et al.

(10) Patent No.: US 12,572,528 B1
(45) **Date of Patent: \*Mar. 10, 2026**

(54) DATABASE WRITEBACK USING AN INTERMEDIARY STATEMENT GENERATOR

(71) Applicant: SIGMA COMPUTING, INC., San Francisco, CA (US)

(72) Inventors: Robert C. Woollen, San Rafael, CA (US); Jason D. Frantz, San Francisco, CA (US); Max H. Seiden, San Francisco, CA (US)

(73) Assignee: SIGMA COMPUTING, INC., San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/456,099

(22) Filed: Aug. 25, 2023

Related U.S. Application Data

(63) Continuation of application No. 17/080,374, filed on Oct. 26, 2020, now Pat. No. 11,782,903.

(51) Int. Cl.
      *G06F 16/23*      (2019.01)
      *G06F 16/22*      (2019.01)
(52) U.S. Cl.
      CPC ...... *G06F 16/2379* (2019.01); *G06F 16/2282* (2019.01)
(58) Field of Classification Search
      CPC ....................... G06F 16/2379; G06F 16/2282
      See application file for complete search history.

(56) References Cited

U.S. PATENT DOCUMENTS

| | | | |
|---|---|---|---|
| 7,013,312 B2 | 3/2006 | Bala et al. | |
| 7,225,189 B1 | 5/2007 | McCormack et al. | |
| 7,546,286 B2 | 6/2009 | Dickinson et al. | |
| 8,006,174 B2 * | 8/2011 | Aureglia | G06F 40/18 |
| | | | 715/219 |
| 8,099,758 B2 | 1/2012 | Schaefer et al. | |
| 8,849,784 B2 * | 9/2014 | Alber | G11B 27/105 |
| | | | 369/53.41 |
| 9,244,914 B2 | 1/2016 | Trumbull et al. | |

(Continued)

OTHER PUBLICATIONS

Anonymous, " Building A Cloud-Based Web App From Scratch, Part 1," https://www.daveaglick.com/posts/building-a-cloud-based-web-app-from-scratch, May 30, 2017, 6 pages.

(Continued)

*Primary Examiner* — Miranda Le

(57) ABSTRACT

Database writeback using an intermediary statement generator including receiving, by a statement generator, a table update request to update a table within a database on a cloud-based data warehouse, wherein the table update request comprises an update value and a selection of a row and a column from the table; verifying, by the statement generator, that the selection is updatable; generating, by the statement generator based on the selection and in response to the verification, an update database statement comprising a table identifier, a column identifier, a row identifier, and the update value; and sending, by the statement generator, the update database statement to the database on the cloud-based data warehouse, wherein the table of the database is updated in response to receiving the update database statement.

16 Claims, 6 Drawing Sheets

(56) References Cited

U.S. PATENT DOCUMENTS

| | | | | |
|---|---|---|---|---|
| 9,330,149 | B2 * | 5/2016 | Angrish | G06F 16/258 |
| 9,396,284 | B2 | 7/2016 | Arora et al. | |
| 10,140,352 | B2 * | 11/2018 | Hariharan | G06F 16/283 |
| 10,698,594 | B2 * | 6/2020 | Sanches | G06F 8/38 |
| 10,719,188 | B2 * | 7/2020 | Sanches | G06F 16/2425 |
| 11,137,987 | B2 * | 10/2021 | Namarvar | G06F 16/435 |
| 11,163,791 | B2 * | 11/2021 | Patel | G06F 16/2282 |
| 11,392,561 | B2 * | 7/2022 | Earnesty, Jr. | G06F 11/3065 |
| 11,657,210 | B2 * | 5/2023 | Sanches | G06F 40/143 |
| | | | | 715/781 |
| 2005/0044113 | A1 | 2/2005 | Manikutty et al. | |
| 2008/0016041 | A1 * | 1/2008 | Frost | G06F 16/258 |
| 2010/0281018 | A1 | 11/2010 | Denuit et al. | |
| 2016/0019281 | A1 | 1/2016 | Hariharan et al. | |
| 2016/0078079 | A1 | 3/2016 | Hu et al. | |
| 2018/0210899 | A1 * | 7/2018 | Cosic | G06F 16/252 |
| 2018/0308145 | A1 * | 10/2018 | Tucker | G06Q 30/0625 |
| 2018/0322168 | A1 | 11/2018 | Levine et al. | |
| 2019/0095413 | A1 * | 3/2019 | Davis | H04L 67/565 |

OTHER PUBLICATIONS

International Search Report and Written Opinion, PCT/US2021/056619, Feb. 8, 2022, 10 pages.

* cited by examiner

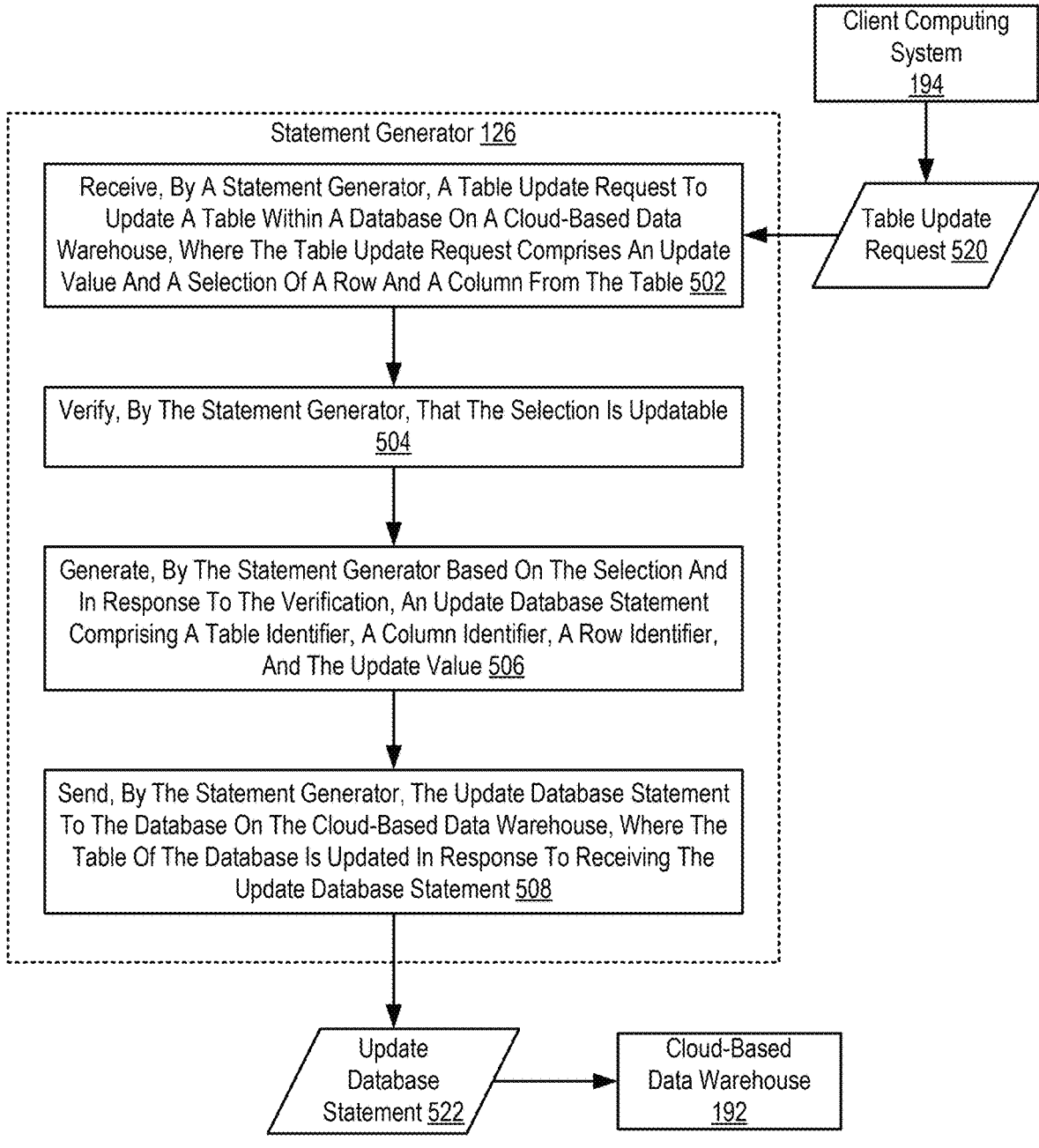

Client Computing System 194

Statement Generator 126

Receive, By A Statement Generator, A Table Update Request To Update A Table Within A Database On A Cloud-Based Data Warehouse, Where The Table Update Request Comprises An Update Value And A Selection Of A Row And A Column From The Table 502

Table Update Request 520

Verify, By The Statement Generator, That The Selection Is Updatable 504

Generate, By The Statement Generator Based On The Selection And In Response To The Verification, An Update Database Statement Comprising A Table Identifier, A Column Identifier, A Row Identifier, And The Update Value 506

Send, By The Statement Generator, The Update Database Statement To The Database On The Cloud-Based Data Warehouse, Where The Table Of The Database Is Updated In Response To Receiving The Update Database Statement 508

Update Database Statement 522

Cloud-Based Data Warehouse 192

FIG. 5

DATABASE WRITEBACK USING AN INTERMEDIARY STATEMENT GENERATOR

BACKGROUND

Field of the Invention

The field of the invention is data processing, or, more specifically, methods, apparatus, and products for database writeback using an intermediary statement generator.

Description of Related Art

Modern businesses may store large amounts of data in remote databases within cloud-based data warehouses. This data may be accessed using database query languages, such as structured query language (SQL). Manipulating the data stored in the database may require constructing complex queries beyond the abilities of most users.

SUMMARY

Methods, systems, and apparatus for database writeback using an intermediary statement generator. Database writeback using an intermediary statement generator includes receiving, by a statement generator, a table update request to update a table within a database on a cloud-based data warehouse, wherein the table update request comprises an update value and a selection of a row and a column from the table; verifying, by the statement generator, that the selection is updatable; generating, by the statement generator based on the selection and in response to the verification, an update database statement comprising a table identifier, a column identifier, a row identifier, and the update value; and sending, by the statement generator, the update database statement to the database on the cloud-based data warehouse, wherein the table of the database is updated in response to receiving the update database statement.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 sets forth a flow chart illustrating an exemplary method for database writeback using an intermediary statement generator according to embodiments of the present invention.

DETAILED DESCRIPTION

Figure 1:
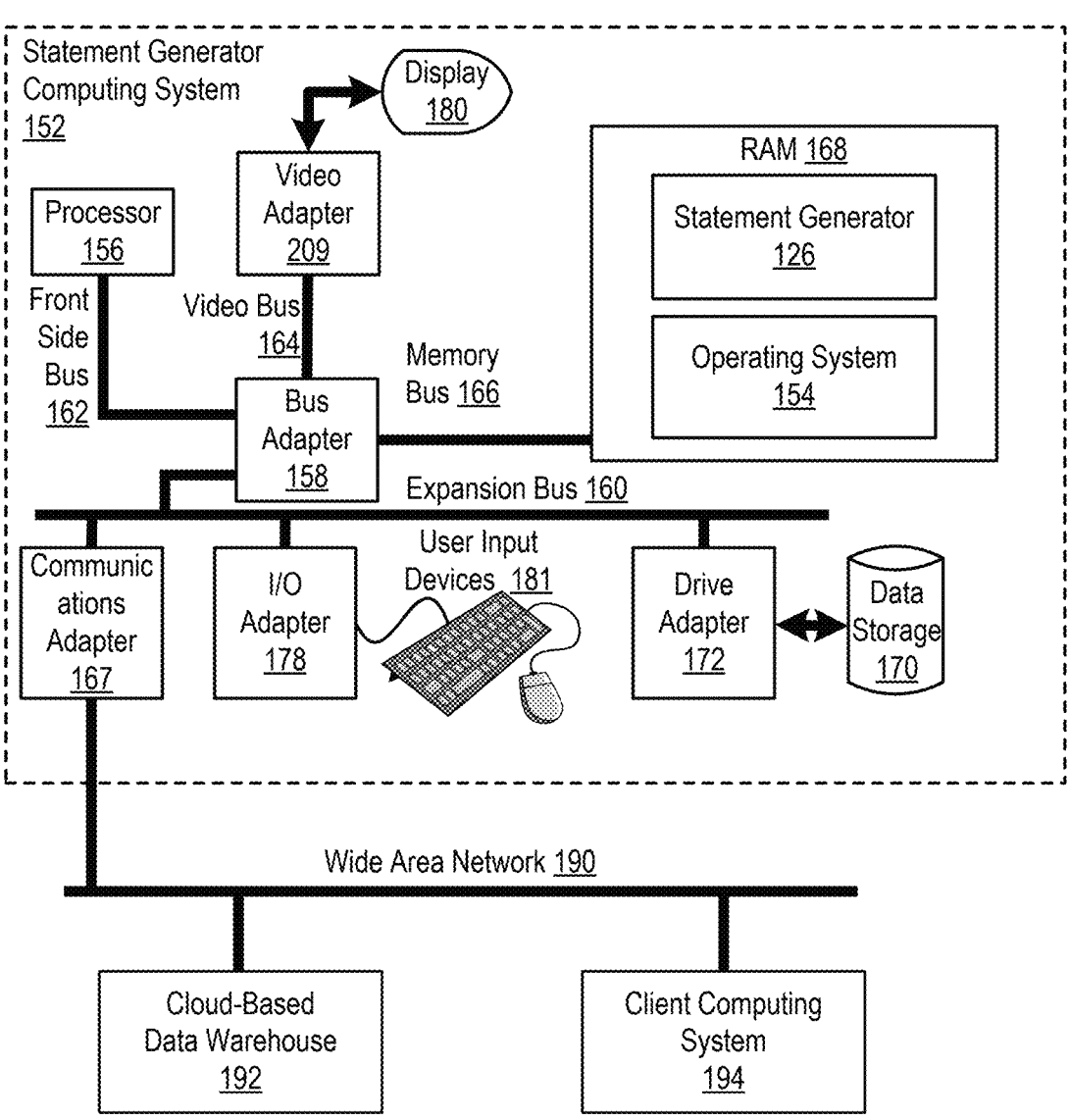
FIG. 1 sets forth a block diagram of an example system configured for database writeback using an intermediary statement generator according to embodiments of the present invention.

Exemplary methods, apparatus, and products for database writeback using an intermediary statement generator in accordance with the present invention are described with reference to the accompanying drawings, beginning with FIG. 1. FIG. 1 sets forth a block diagram of automated computing machinery comprising an exemplary statement generator computing system (152) configured for database writeback using an intermediary statement generator according to embodiments of the present invention. The statement generator computing system (152) of FIG. 1 includes at least one computer processor (156) or 'CPU' as well as random access memory (168) ('RAM') which is connected through a high speed memory bus (166) and bus adapter (158) to processor (156) and to other components of the statement generator computing system (152).

Stored in RAM (168) is an operating system (154). Operating systems useful in computers configured for database writeback using an intermediary statement generator according to embodiments of the present invention include UNIX™, Linux™, Microsoft Windows™, AIX™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the statement generator (126), a module for database writeback using an intermediary statement generator according to embodiments of the present invention.

The statement generator computing system (152) of FIG. 1 includes disk drive adapter (172) coupled through expansion bus (160) and bus adapter (158) to processor (156) and other components of the statement generator computing system (152). Disk drive adapter (172) connects non-volatile data storage to the statement generator computing system (152) in the form of data storage (170). Disk drive adapters useful in computers configured for database writeback using an intermediary statement generator according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example statement generator computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example statement generator computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary statement generator computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for database writeback using an intermediary statement generator according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database or databases for access over the wide area network (190). The client computing system (194) is a computing system that accesses the database using the statement generator (126) on the statement generator computing system (152).

Figure 2:
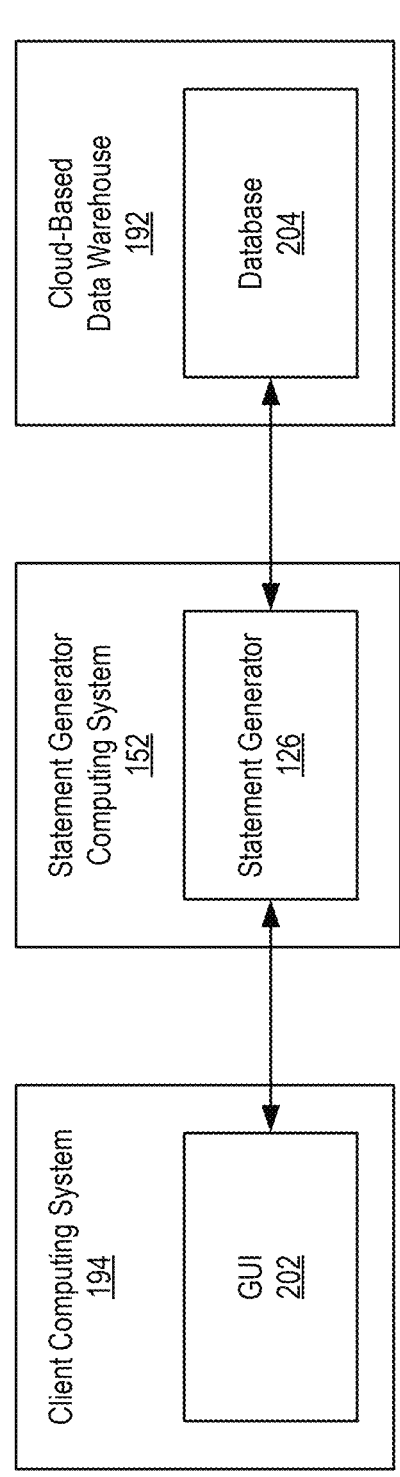
FIG. 2 sets forth a block diagram of an example system configured for database writeback using an intermediary statement generator according to embodiments of the present invention.

FIG. 2 shows an exemplary system for database writeback using an intermediary statement generator according to embodiments of the present invention. As shown in FIG. 2, the system includes a client computing system (194), a statement generator computing system (152), and a cloud-based data warehouse (192). The client computing system (194) includes a graphical user interface (GUI) (202). The statement generator computing system (152) includes a statement generator (126). The cloud-based data warehouse (192) includes a database (204). The statement generator computing system (152) is an intermediary computing system between the client computing system (194) and the cloud-based data warehouse (192).

The GUI (202) is a visual presentation configured to present data sets in various forms including worksheets and graphical elements to a user. The GUI (202) also receives requests from a user for data sets from the database (204). The GUI (202) may be presented, in part, by the statement generator (126) and displayed on a client computing system (194) (e.g., on a system display or mobile touchscreen). The GUI (202) may be part of an Internet application that includes the statement generator (126) and is hosted on the statement generator computing system (152).

The database (204) is a collection of data and a management system for the data. A data set is a collection of data (such as a table or portion of a table) from the database (204). Data sets may be organized into columns and rows (also referred to as records). The particular columns, rows, and organization of the columns and rows that make up a data set may be specified in the database statement requesting the data set. A data set, as sent from the database to the statement generator computing system (152) and client computing system (194), may be a portion or subset of a source database table on the database.

The statement generator (126) is hardware, software, or an aggregation of hardware and software configured to receive a state specification from the client computing system (194), via the GUI (202). The statement generator (126) is also configured to generate database statements (i.e., queries) in response to manipulations of the GUI (202) described in the state specification. Such database statements may include writebacks to the database. Writeback refers to changes or updates to cells (i.e., fields) within a table on the database. The statement generator (126) may be part of a database query generator that generates the database statements.

The state specification is a collection of data describing inputs into the GUI (202). The state specification may include manipulations of GUI elements within the GUI (202) along with data entered into the GUI (202) by a user of the client computing system (194). Such manipulations and data may indicate requests for and manipulations of data sets. The state specification may be a standard file format used to exchange data in asynchronous browser-server communication. For example, the state specification may be a JavaScript Object Notation specification.

The state specification may include descriptions of elements that are used to apply changes to the data set. Such elements may include filters applied to the worksheet, the hierarchical level of the worksheet, joins performed within the worksheet, exposable parameters in the worksheet, and security for the worksheet. An exposable parameter is variable within a worksheet function that can be presented and adjusted without presenting, adjusting, or otherwise exposing the worksheet function itself. Security for the worksheet may include hiding portions of the data set that the particular user or a particular group of users is not authorized to view.

The statement generator (126) uses the state specification as input to compile a database statement (also referred to as a query). This compilation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database query.

Figure 3:
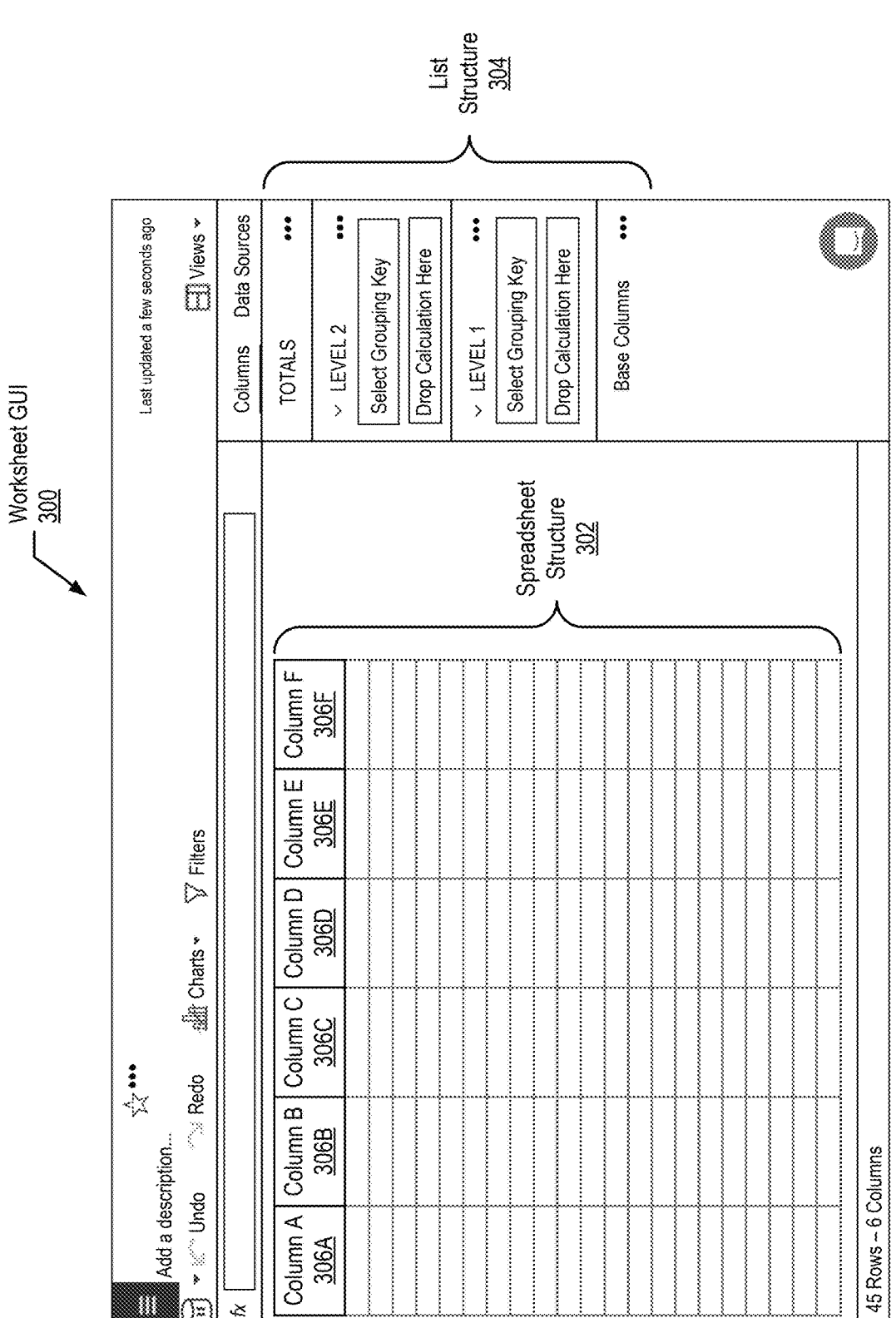
FIG. 3 sets forth a block diagram of an example system configured for database writeback using an intermediary statement generator according to embodiments of the present invention.

FIG. 3 shows an exemplary system for database writeback using an intermediary statement generator according to embodiments of the present invention. Specifically, FIG. 3 shows a worksheet GUI (300), which is a type of GUI as described in FIG. 2. As shown in FIG. 3, the exemplary worksheet GUI (300) includes a spreadsheet structure (302) and a list structure (304). The spreadsheet structure (302) includes a worksheet (shown as empty rows) with six columns (column A (306A), column B (306B), column C (306C), column D (306D), column E (306E), column F (306F)).

The worksheet GUI (300) is a GUI for presenting a worksheet. A worksheet is a presentation of a data set (such as a table, portion of a table, or combination of portions of different tables) from a database on a data warehouse. The spreadsheet structure (302) is a graphical element and organizing mechanism for the worksheet that presents the data set. The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship"

refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The worksheet GUI (300) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The worksheet GUI (300) may also include a mechanism for a user to request a table from a database to be presented as a worksheet in the worksheet GUI (300). Such a mechanism may be part of the interactivity of the worksheet. Specifically, a user may manipulate a worksheet (e.g., by dragging and dropping columns or rows, resorting columns or rows, etc.) and, in response, the worksheet GUI (300) may generate a request (e.g., in the form of a state specification) for a data set and send the request to the statement generator (126). Such a mechanism may also include a direct identification of the rows and columns of a database table that a user would like to access (e.g., via a selection of the rows and columns in a dialog box).

Figure 4:
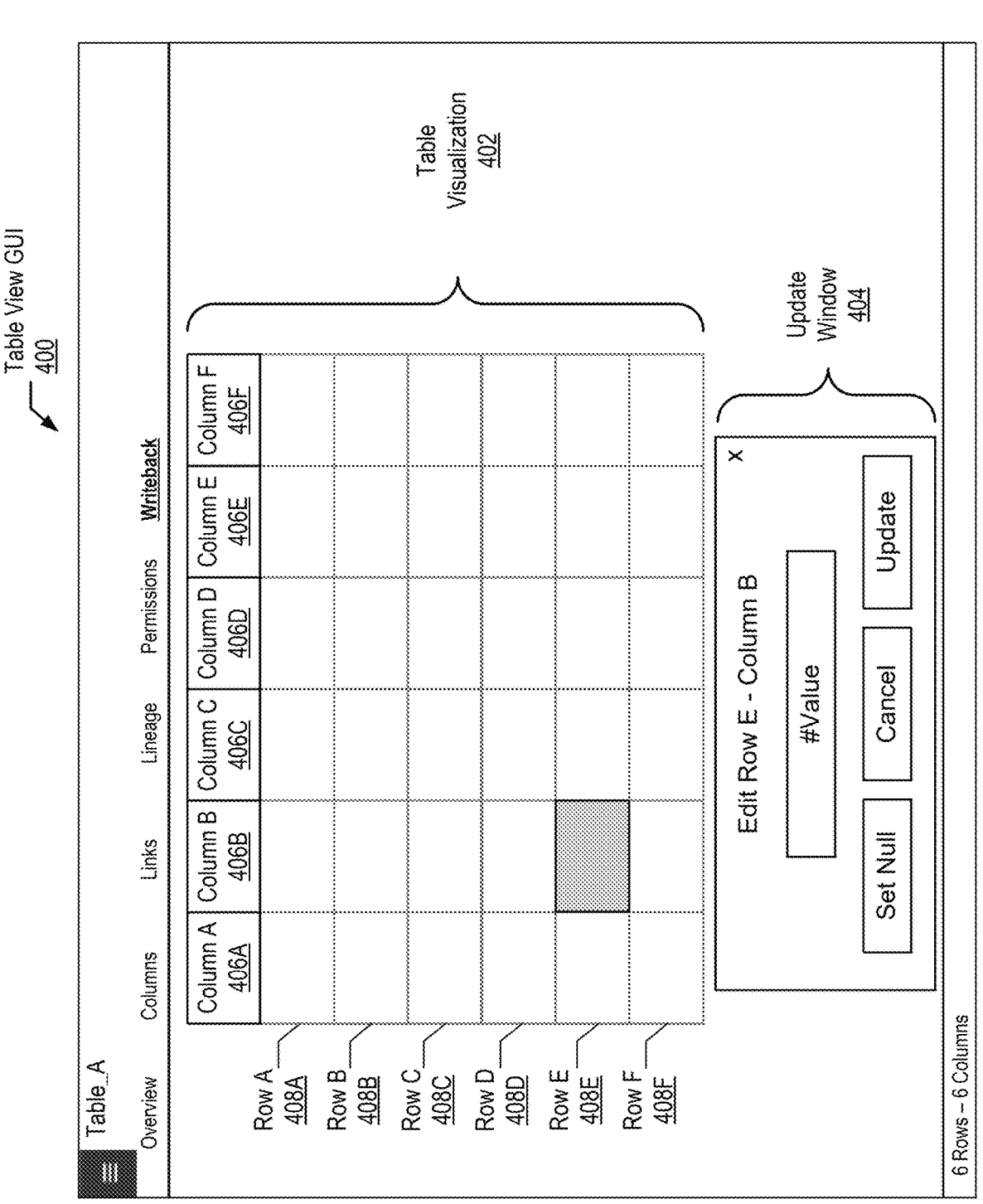
FIG. 4 sets forth a block diagram of an example system configured for database writeback using an intermediary statement generator according to embodiments of the present invention.

FIG. 4 shows an exemplary system for database writeback using an intermediary statement generator according to embodiments of the present invention. Specifically, FIG. 4 shows a table view GUI (400), which is a type of GUI as described in FIG. 2. As shown in FIG. 4, the exemplary table view GUI (400) includes a table view (402) and an update window (404). The table view (402) includes a table visualization (shown as empty values) with six columns (column A (406A), column B (406B), column C (406C), column D (406D), column E (406E), column F (406F)) and six rows (row A (408A), row B (408B), row C (408C), row D (408D), row E (408E), row F (408F)). The empty cell at column B (406B), row E (408E) has been selected (shown as shaded).

The table view GUI (400) is a GUI for presenting a table from a database. In contrast to the worksheet GUI shown in FIG. 3, the table view GUI (400) may present only a single table or portion of a table from the database. The table view GUI (400) (through the table view (402)) may present a portion of a very large table (e.g., greater than one million records). Using the table view GUI (400), a user may update values in the table on the database. Specifically, changes made to a table presented in the table view (402) may then be pushed to the database on the cloud-based data warehouse.

The table view (402) is a graphical element for visualizing a table or portion of a table from the database. The table view (402) displays the table as rows (row A (408A), row B (408B), row C (408C), row D (408D), row E (408E), row F (408F)) of values organized by columns (column A (306A), column B (306B), column C (306C), column D (306D), column E (306E), column F (306F)).

The update window (404) is a graphical element for updating a value in the table presented in the table view (402). The update window (404) presents a field to a user (shown containing a value of "#Value") allowing a user to enter a value into the selected cell of the table. The update window (404) also includes options to set the value of the cell to "null", cancel the operation, or commit the change to the value ("update" button).

For further explanation, FIG. 5 sets forth a flow chart illustrating an exemplary method for database writeback using an intermediary statement generator according to embodiments of the present invention that includes receiving (502), by a statement generator (126), a table update request (520) to update a table within a database on a cloud-based data warehouse (192), wherein the table update request (520) comprises an update value and a selection of a row and a column from the table. The table update request (520) is an instruction to add or overwrite a value in a cell of a table on a database. The table update request (520) includes an update value which is a value that is to be written to the database. The selection is an indication of the particular cell (column identifier and row identifier) to which the update value is to be written. The table update request (520) also includes an identifier of the particular table to be updated. The table update request (520) may include a request to add a new row or a new column to the database. The table update request (520) may be received from the client computing system (194) in the form of a state specification or an invocation of one or more programing interfaces exposed by the statement generator (126).

The method of FIG. 5 further includes verifying (504), by the statement generator (126), that the selection is updatable. Verifying (504), by the statement generator (126), that the selection is updatable is performed prior to sending the database statement (522) to the cloud-based data warehouse (192). Further, verifying (504), by the statement generator (126), that the selection is updatable is performed on the statement generator computing system rather than the cloud-based data warehouse (192).

Verifying (504), by the statement generator (126), that the selection is updatable may be carried out by determining that a user associated with the update request is authorized to update the selection. Specifically, the statement generator may compare the user's authorizations against the permission associated with the table, portion of the table, or specific targeted cell of the table. If the user is authorized to change the value of the cell, the statement generator (126) verifies that the selection is updatable.

Verifying (504), by the statement generator (126), that the selection is updatable may also be carried out by determining that the update value is an acceptable type of value. The statement generator (126) or database may be configured to only accept a particular type of value in the target cell. Acceptable types of values may include, for example, an alphanumeric string, a date, an integer, a currency value, etc. If the update value is one of the acceptable types of values, the statement generator (126) verifies that the selection is updatable.

Verifying (504), by the statement generator (126), that the selection is updatable may also be carried out by determining that the update value is one of a group of acceptable update values. The statement generator (126) or database may be configured to only accept one of a group of acceptable values in the target cell. Groups of acceptable values may include, for example, days of the week, months of the year, employees of a company, countries in Europe, etc. If the update value is one of the acceptable values in the group of values, the statement generator (126) verifies that the selection is updatable.

Verifying (504), by the statement generator (126), that the selection is updatable may also include retrieving permission information for the table from the cloud-based data warehouse. Specifically, the statement generator (126) may communicate with the database and/or the cloud-based data warehouse to obtain the permission information for the table. Permission information may include the permissions associated with the target cell for updating, the acceptable value types, and acceptable update values. Once the permission information for the selection is retrieved, the update value is compared to the permission information.

The method of FIG. 5 further includes generating (506), by the statement generator (126) based on the selection and in response to the verification, an update database statement (522) comprising a table identifier, a column identifier, a row identifier, and the update value. Generating (506), by the statement generator (126) based on the selection and in response to the verification, an update database statement (522) comprising a table identifier, a column identifier, a row identifier, and the update value may be carried out by compiling the update database statement from the table update request (520). The update database statement may be a structured query language (SQL) statement.

The method of FIG. 5 further includes sending (508), by the statement generator (126), the update database statement (522) to the database on the cloud-based data warehouse (192), wherein the table of the database is updated in response to receiving the update database statement (522). Sending (508), by the statement generator (126), the update database statement (522) to the database on the cloud-based data warehouse (192), wherein the table of the database is updated in response to receiving the update database statement (522) may be carried out by transmitting the update database statement (522) over a wide area network to the cloud-based data warehouse.

Sending (508), by the statement generator (126), the update database statement (522) to the database on the cloud-based data warehouse (192) may include passing credentials for a user associated with the update request to the cloud-based data warehouse. Altering the table on the database may require authentication using credentials for the user associated with the table update request (520) or credentials associated with the statement generator (126). The credentials or authentication token may be included in the update database statement (522).

The above features improve the operation of the computer system by providing a mechanism for users to update values in a database through a table visualization. This is accomplished by receiving a table update request, verifying portions of the request, generating the database statement, and sending the database statement to the database.

Figure 6:
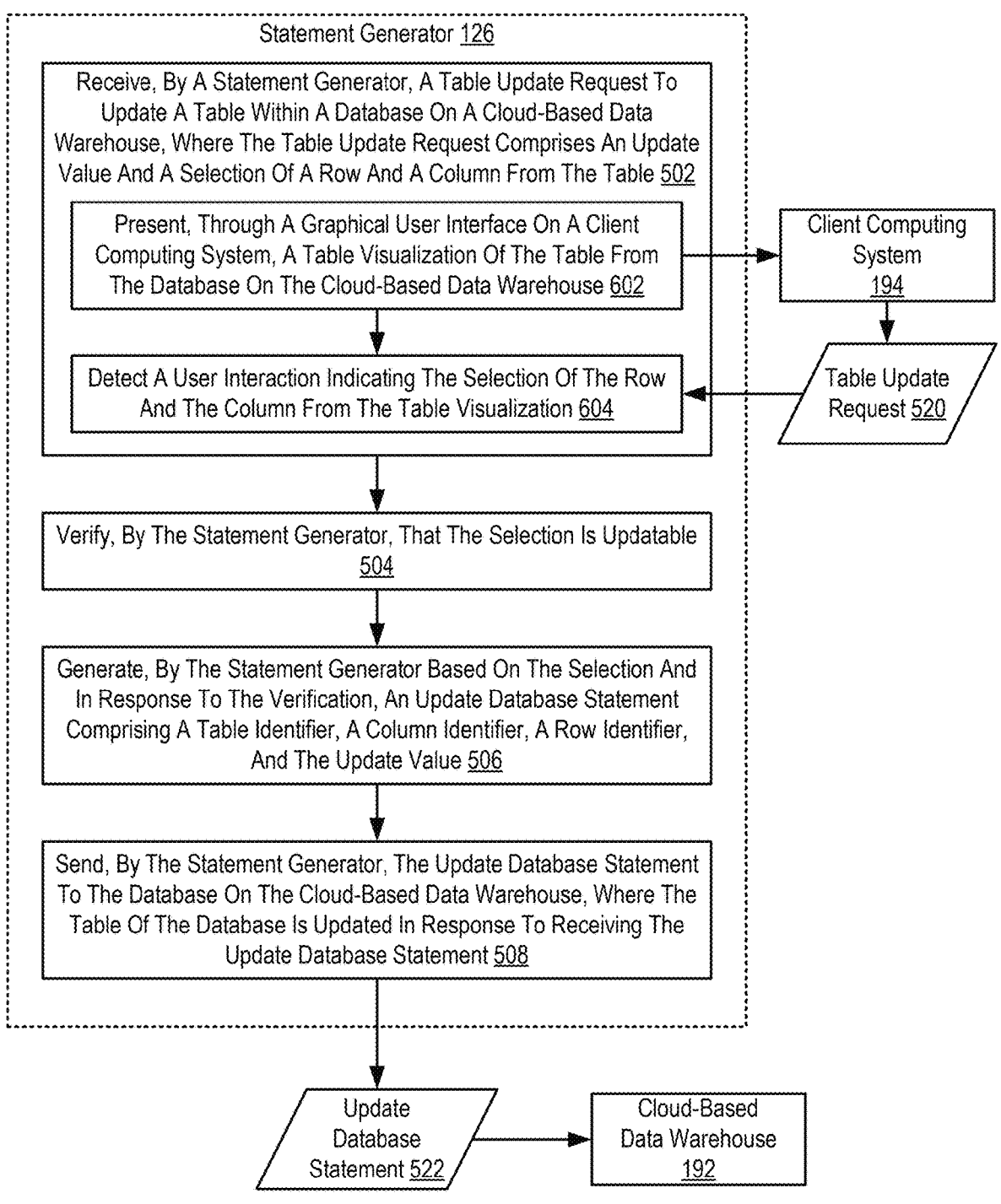
FIG. 6 sets forth a flow chart illustrating an exemplary method for database writeback using an intermediary statement generator according to embodiments of the present invention.

For further explanation, FIG. 6 sets forth a flow chart illustrating a further exemplary method for database writeback using an intermediary statement generator according to embodiments of the present invention that includes receiving (502), by a statement generator (126), a table update request (520) to update a table within a database on a cloud-based data warehouse (192), wherein the table update request (520) comprises an update value and a selection of a row and a column from the table; verifying (504), by the statement generator (126), that the selection is updatable; generating (506), by the statement generator (126) based on the selection and in response to the verification, an update database statement (522) comprising a table identifier, a column identifier, a row identifier, and the update value; and sending (508), by the statement generator (126), the update database statement (522) to the database on the cloud-based data warehouse (192), wherein the table of the database is updated in response to receiving the update database statement (522).

The method of FIG. 6 differs from the method of FIG. 5, however, in that receiving (502), by a statement generator (126), a table update request (520) to update a table within a database on a cloud-based data warehouse (192), wherein the table update request (520) comprises an update value and a selection of a row and a column from the table includes presenting (602), through a graphical user interface on a client computing system (194), a table visualization of the table from the database on the cloud-based data warehouse (192); and detecting (604) a user interaction indicating the selection of the row and the column from the table visualization.

Presenting (602), through a graphical user interface on a client computing system (194), a table visualization of the table from the database on the cloud-based data warehouse (192) may be carried out by retrieving the table from the cloud-based data warehouse (192), generating the table visualization of the table, and sending, to the client computing system (194) the table visualization. A table visualization is a graphical presentation of a table or portion of a table from a database on a cloud-based data warehouse (192). The table visualization may be the worksheet or table view described above in FIG. 3 and FIG. 4.

Detecting (604) a user interaction indicating the selection of the row and the column from the table visualization may be carried out by receiving a state specification describing the user interaction with the table visualization. Once the statement generator (126) receives the state specification, the state specification may be used to generate the update database statement. Specifically, generating the update database statement may include compiling the update database statement from a state specification of the graphical user interface on the client computing system.

In view of the explanations set forth above, readers will recognize that the benefits of database writeback using an intermediary statement generator according to embodiments of the present invention include:

Improving the operation of a computing system by providing a mechanism for users to update values in a database through a table visualization, increasing computing system efficiency and usability.

Exemplary embodiments of the present invention are described largely in the context of a fully functional computer system for database writeback using an intermediary statement generator. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of database writeback using an intermediary statement generator, the method comprising:

receiving, from a client computing system by a statement generator, a table update request to update a table within a database on a cloud-based data warehouse, including presenting, through a graphical user interface on the client computing system, a table visualization of the table, wherein the table update request comprises an update value and a selection of a row and a column from the table, wherein receiving the table update request includes detecting a user interaction indicating the selection of the row and the column from the table visualization, and wherein the statement generator is included within an intermediary computing system between the client computing system and the cloud-based data warehouse;

verifying, by the statement generator, that the selection is updatable, including retrieving permission information specific to the table from the cloud-based data warehouse; and sending, to the database on the cloud-based data warehouse by the statement generator based on the selection and in response to the verifying, an update database statement comprising a table identifier, a column identifier, a row identifier, and the update value.

2. The method of claim 1, further comprising:

determining that a user associated with the table update request is authorized to update the selection.

3. The method of claim 1, further comprising:

verifying, by the statement generator, that the update value is an acceptable type of value for the selected row and column of the table.

4. The method of claim 1, further comprising:

determining that the update value is one of a group of acceptable update values.

5. The method of claim 1, wherein sending, by the statement generator, the update database statement to the database on the cloud-based data warehouse comprises passing credentials for a user associated with the table update request to the cloud-based data warehouse.

6. The method of claim 1, wherein the table update request further comprises a request to add a new row to the database.

7. The method of claim 1, wherein the table update request further comprises an identifier of the table.

8. The method of claim 1, wherein the update database statement may be a structured query language (SQL) statement.

9. An apparatus for database writeback using an intermediary statement generator, the apparatus comprising a computer processor, a computer memory operatively coupled to the computer processor, the computer memory having disposed within it computer program instructions that, when executed by the computer processor, cause the apparatus to carry out the steps of:

receiving, from a client computing system by a statement generator, a table update request to update a table within a database on a cloud-based data warehouse, including presenting, through a graphical user interface on the client computing system, a table visualization of the table, wherein the table update request comprises an update value and a selection of a row and a column from the table, wherein receiving the table update request includes detecting a user interaction indicating the selection of the row and the column from the table visualization, and wherein the statement generator is included within an intermediary computing system between the client computing system and the cloud-based data warehouse;

verifying, by the statement generator, that the selection is updatable, including retrieving permission information specific to the table from the cloud-based data warehouse; and sending, to the database on the cloud-based data warehouse by the statement generator based on the selection and in response to the verifying, an update database statement comprising a table identifier, a column identifier, a row identifier, and the update value.

10. The apparatus of claim 9, wherein the computer program instructions further cause the apparatus to carry out the steps of:

determining that a user associated with the table update request is authorized to update the selection.

11. The apparatus of claim 9, wherein the computer program instructions further cause the apparatus to carry out the steps of:

verifying, by the statement generator, that the update value is an acceptable type of value for the selected row and column of the table.

12. The apparatus of claim 9, wherein the computer program instructions further cause the apparatus to carry out the steps of:

determining that the update value is one of a group of acceptable update values.

13. The apparatus of claim 9, wherein sending, by the statement generator, the update database statement to the database on the cloud-based data warehouse comprises passing credentials for a user associated with the table update request to the cloud-based data warehouse.

14. The apparatus of claim 9, wherein the table update request further comprises a request to add a new row to the database.

15. The apparatus of claim 9, wherein the table update request further comprises an identifier of the table.

16. A computer program product for database writeback using an intermediary statement generator, the computer program product disposed upon a non-transitory computer readable medium, the computer program product comprising computer program instructions that, when executed, cause a computer to carry out the steps of:

receiving, from a client computing system by a statement generator, a table update request to update a table within a database on a cloud-based data warehouse, including presenting, through a graphical user interface on the client computing system, a table visualization of the table, wherein the table update request comprises an update value and a selection of a row and a column from the table, wherein receiving the table update request includes detecting a user interaction indicating the selection of the row and the column from the table visualization, and wherein the statement generator is included within an intermediary computing system between the client computing system and the cloud-based data warehouse;

verifying, by the statement generator, that the selection is updatable, including retrieving permission information specific to the table from the cloud-based data warehouse; and sending, to the database on the cloud-based data warehouse by the statement generator based on the selection and in response to the verifying, an update database statement comprising a table identifier, a column identifier, a row identifier, and the update value.

* * * * *